United States Patent
Silverman et al.

(10) Patent No.: US 9,706,514 B2
(45) Date of Patent: Jul. 11, 2017

(54) WIDEBAND ANGLE-OF-ARRIVAL LOCATION DETERMINATION USING BANDWIDTH PARTITIONING

(71) Applicant: Cisco Technology, Inc., San Jose, CA (US)

(72) Inventors: Matthew A. Silverman, Shaker Heights, OH (US); Paul J. Stager, Akron, OH (US); Brian D. Hart, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 87 days.

(21) Appl. No.: 14/558,205

(22) Filed: Dec. 2, 2014

(65) Prior Publication Data

US 2016/0157201 A1    Jun. 2, 2016

(51) Int. Cl.
| | |
|---|---|
| *H04W 24/00* | (2009.01) |
| *H04W 64/00* | (2009.01) |
| *G01S 5/02* | (2010.01) |
| *G01S 5/04* | (2006.01) |
| *H04W 84/12* | (2009.01) |

(52) U.S. Cl.
CPC .......... *H04W 64/00* (2013.01); *G01S 5/0226* (2013.01); *G01S 5/0273* (2013.01); *G01S 5/04* (2013.01); *H04W 84/12* (2013.01)

(58) Field of Classification Search
None
See application file for complete search history.

(56) References Cited

U.S. PATENT DOCUMENTS

| | | |
|---|---|---|
| 5,017,929 A | 5/1991 | Tsuda |
| 6,594,226 B1 | 7/2003 | Benning et al. |
| | (Continued) | |

FOREIGN PATENT DOCUMENTS

WO    2012/063532 A1    5/2012

OTHER PUBLICATIONS

Balan, et al., "AirSync: Enabling Distributed Multiuser MIMO with Full Spatial Multiplexing," IEEE/ACM Transactions on Networking, Jul. 2012, pp. 1-15.
(Continued)

*Primary Examiner* — Shantell L Heiber
(74) *Attorney, Agent, or Firm* — Edell, Shapiro & Finnan, LLC

(57) ABSTRACT

Techniques are presented herein for improving location determination of a wireless device in environments where there can be multipath issues. A wireless device having a plurality of antennas receives a wireless transmission from a target device whose location is to be determined. Channel state information data is generated based on reception of the transmission at the plurality of antenna. The channel state information data is separated or partitioned into subcarrier group specific data for each of a plurality of groups of subcarriers within a bandwidth of the received transmission. Location probability data is computed for each of the plurality of groups of subcarriers from the subcarrier group specific data for respective ones of the plurality of groups of subcarriers. The location probability data for the plurality of groups of subcarriers is combined to produce aggregate location probability data, from which a location of the target device is determined.

26 Claims, 10 Drawing Sheets

(56) References Cited

U.S. PATENT DOCUMENTS

| | | | |
|---|---|---|---|
| 7,200,392 B2 | 4/2007 | Kennedy, Jr. et al. | |
| 7,274,677 B1 | 9/2007 | Lewis | |
| 7,953,176 B2* | 5/2011 | Roh | H04B 7/0417 375/295 |
| 8,050,288 B2 | 11/2011 | Kapoor et al. | |
| 8,207,892 B2 | 6/2012 | Abbasfar | |
| 8,233,554 B2 | 7/2012 | Karabinis | |
| 8,233,920 B2 | 7/2012 | Gerstenberger et al. | |
| 8,254,847 B2 | 8/2012 | Sen | |
| 8,503,283 B2 | 8/2013 | Kafle et al. | |
| 8,526,391 B2 | 9/2013 | Issakov et al. | |
| 8,532,677 B2* | 9/2013 | Halfmann | H04W 64/00 370/329 |
| 8,537,916 B2 | 9/2013 | Karabinis | |
| 8,582,592 B2* | 11/2013 | Gorokhov | H04L 1/0026 370/329 |
| 8,723,729 B2 | 5/2014 | Desai et al. | |
| 8,767,691 B2 | 7/2014 | Li et al. | |
| 8,768,344 B2 | 7/2014 | Naguib et al. | |
| 8,774,037 B2* | 7/2014 | Kim | H04B 7/024 370/252 |
| 8,831,594 B2 | 9/2014 | Naguib et al. | |
| 8,924,155 B2 | 12/2014 | Waters et al. | |
| 9,002,349 B2 | 4/2015 | Naguib et al. | |
| 9,332,523 B2 | 5/2016 | Zhang et al. | |
| 9,521,520 B2 | 12/2016 | Silverman et al. | |
| 2008/0051145 A1 | 2/2008 | Jin | |
| 2008/0080631 A1 | 4/2008 | Forenza et al. | |
| 2008/0118004 A1 | 5/2008 | Forenza et al. | |
| 2008/0130790 A1 | 6/2008 | Forenza et al. | |
| 2009/0016463 A1* | 1/2009 | Roh | H04B 7/0417 375/295 |
| 2009/0034640 A1 | 2/2009 | Sondur | |
| 2009/0067402 A1 | 3/2009 | Forenza et al. | |
| 2009/0110087 A1 | 4/2009 | Liu et al. | |
| 2010/0130230 A1 | 5/2010 | Aggarwal et al. | |
| 2010/0172309 A1 | 7/2010 | Forenza et al. | |
| 2010/0316163 A1 | 12/2010 | Forenza et al. | |
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |
| 2011/0003608 A1 | 1/2011 | Forenza et al. | |
| 2011/0044193 A1 | 2/2011 | Forenza et al. | |
| 2012/0087430 A1 | 4/2012 | Forenza et al. | |
| 2012/0093078 A1 | 4/2012 | Perlman et al. | |
| 2012/0214512 A1 | 8/2012 | Siomina et al. | |
| 2012/0256726 A1 | 10/2012 | Honkanen et al. | |
| 2012/0257508 A1 | 10/2012 | Reunamäki et al. | |
| 2012/0314570 A1 | 12/2012 | Forenza et al. | |
| 2013/0034130 A1 | 2/2013 | Forenza et al. | |
| 2013/0039168 A1 | 2/2013 | Forenza et al. | |
| 2013/0094392 A1* | 4/2013 | Kim | H04L 1/0026 370/252 |
| 2014/0327579 A1 | 11/2014 | Hart et al. | |
| 2016/0033616 A1 | 2/2016 | Sen et al. | |

OTHER PUBLICATIONS

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

Majid, et al., "Parallel implementation of the wideband DOA algorithm on single core, multicore, GPU and IBM cell BE processor," Science Journal of Circuits, Systems and Signal Processing, Apr. 2, 2013, pp. 29-36.

Frikel, et al., "Bearing detection of noised wideband sources for geolocation," IEEE, 18th Mediterranean Conference on Control & Automation (MED), 2010, Jun. 2010, pp. 1650-1653.

Bourennane, et al., "Wideband Array Processing Using a Partitioned Spectral Matrix," European Association for Signal Processing, EUSIPCO-96, VIII European Signal Processing Conference, Sep. 10-13, 1996, 4 pages.

Michael A. Leabman, "Adaptive Band-Partitioning for Interference Cancellation in Communication Systems", Feb. 1997, Submitted to the Department of Electrical Engineering and Computer Science in Partial Fulfillment of the Requirements for the Degrees of Bachelor of Science in electrical Science and Engineering and Master of Engineering in Electrical Engineering and Computer Science at the Massachusetts Institute of Technology, 70 pages.

A. Hafiizh et al., "Multiple Subcarrier Indoor Geolocation System in MIMO-OFDM WLAN APs structure", World Academy of Science, Engineering and Technology, International Journal of Mathematical, Computational, Physical, Electrical and Computer Engineering, vol. 3, No. 10, waset.org/Publication/E1621, Oct. 2009, 7 pages.

* cited by examiner

WIDEBAND ANGLE-OF-ARRIVAL LOCATION DETERMINATION USING BANDWIDTH PARTITIONING

TECHNICAL FIELD

The present disclosure relates to wireless communications.

BACKGROUND

In Angle of Arrival (AoA) or any location technology used to locate wireless device, it is desirable to reduce location error due to signal-to-noise ratio (SNR) and multipath in order to achieve more accurate location results. In AoA-based location techniques, raw data (from channel state information or raw in-phase/quadrature-phase samples) is converted into phase vectors that are supplied as input to the AoA-based location solution. The manner in which the phase vectors are converted and ultimately input into the AoA-based computation can significantly affect accuracy.

DESCRIPTION OF EXAMPLE EMBODIMENTS

Overview

In one embodiment, techniques are presented herein for improving location determination of a wireless device in environments where there can be multipath issues. A wireless device having a plurality of antennas receives a wireless transmission from a target device whose location is to be determined. Channel state information data is generated based on reception of the transmission at the plurality of antenna. The channel state information data is separated or partitioned into subcarrier group specific data for each of a plurality of groups of subcarriers within a bandwidth of the received transmission. Location probability data is computed for each of the plurality of groups of subcarriers from the subcarrier group specific data for respective ones of the plurality of groups of subcarriers. The location probability data for the plurality of groups of subcarriers is combined to produce aggregate location probability data. A location of the target device is determined from the aggregate location probability data.

Example Embodiments

Figure 1:
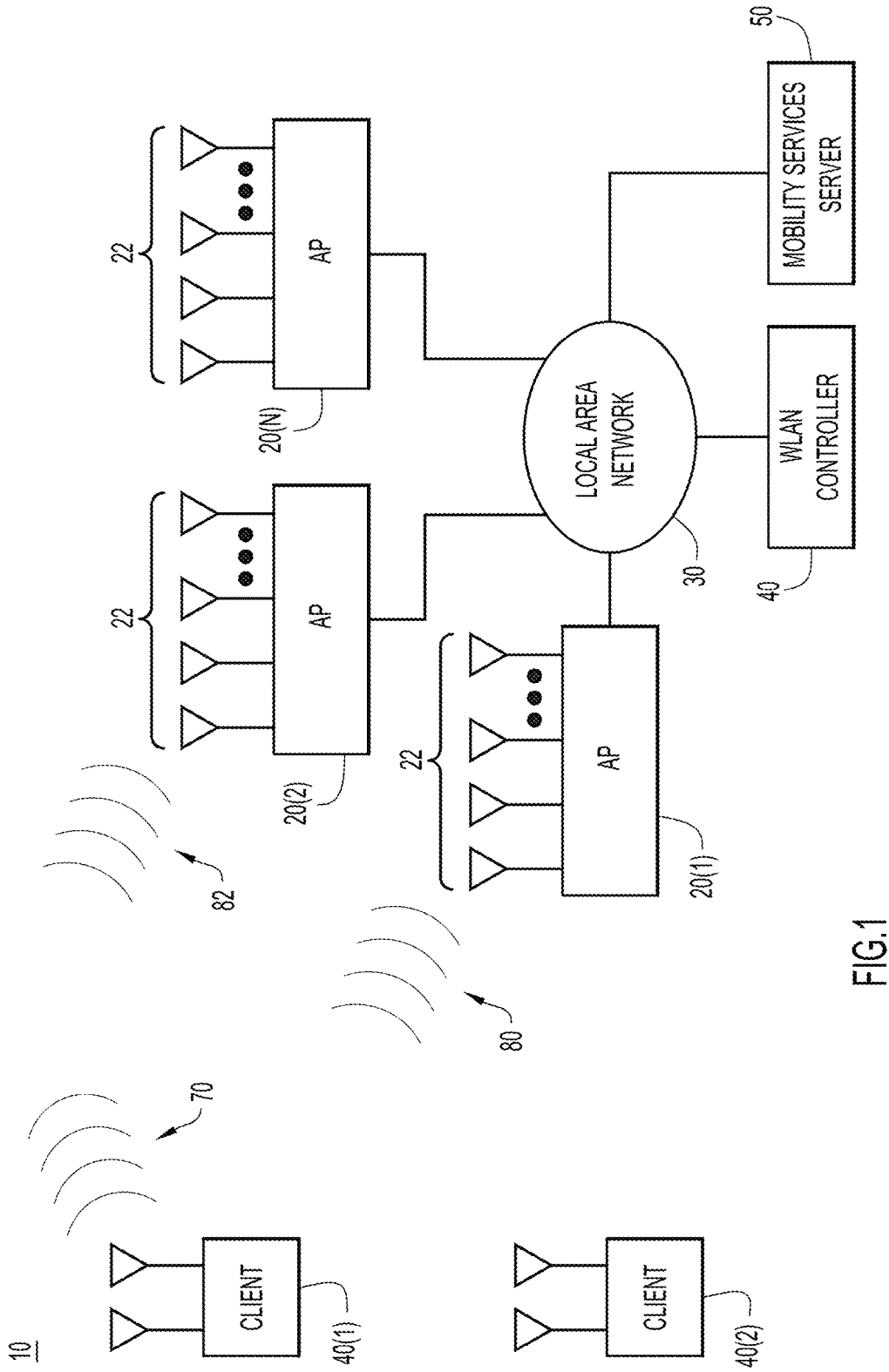
FIG. 1 is a block diagram of a wireless network environment in which one or more wireless access points are configured to generate channel state information for groups of subcarriers within a frequency bandwidth of a received wireless transmission, from which location probability data is generated for each group of subcarriers, according to an example embodiment.

Reference is first made to FIG. 1. FIG. 1 shows a network environment 10 that supports wireless network capability, such as a Wi-Fi® wireless local area network (WLAN). To this end, there are multiple wireless access points (APs), shown at reference numerals 20(1)-20(N). The APs support WLAN connectivity for multiple wireless client devices (also called "clients" herein) shown at reference numerals 40(1) and 40(2). It should be understood that FIG. 1 is only a simplified example. There may be numerous more clients in a real network deployment. Moreover, for some applications, there may be only a single AP in a deployment. Each of the APs 20(1)-20(N) has a plurality of antennas or an array or antenna elements, shown collectively at reference numeral 22. The number of antennas at each AP may vary. In one example, there are 4, 8, 16 or 32 antenna elements at each AP.

There is back-end infrastructure that is used for control and other functions of the WLAN. Specifically, the APs 20(1) and 20(2) connect to a wired local area network 30 to which are also connected a WLAN controller 50 and a mobility services server 60. The WLAN controller 50 performs control functions for the APs 20(1) and 20(2) and clients 40(1)-40(5) as described further hereinafter. In addition, and as described in more detail hereinafter, the mobility services server 60 performs, among other things, location functions to track the locations of clients based on data gathered from signals received at one or more APs (or at other wireless devices at fixed locations). The WLAN controller 50 and mobility services server 60 may reside on the same physical apparatus, or may be applications running on a data center. Thus, both the WLAN controller 50 and mobility services server 60 are not required in order to performance the techniques presented herein.

As shown in FIG. 1, client 40(1) is the target device to be located, and it sends a transmission shown at reference numeral 70 that travels over the air and is received at one or more of the APs 20(1)-20(N). In the example of FIG. 1, the transmission 70 is received by AP 20(1) at reference numeral 80 and by AP 20(2) at reference numeral 82. More specifically, AP 20(1) generates channel state information data based on reception of the transmission at its plurality of antennas 22, and AP 20(2) generates channel state information data based on reception of the transmission at its plurality of antennas 22.

A wideband wireless signal can be leveraged to reduce location error. In Wi-Fi networks, the bandwidths of signals are still too narrow to use traditional multipath mitigation techniques which are effective in most environments. Use of wideband signals in reducing multipath error in AoA and location in general has been limited to taking Fast Fourier Transforms (FFTs) of Orthogonal Frequency Division Multiplexed (OFDM) channel estimations and analyzing in the time domain to determine the direct component signal and ignore the multipath components, which appear later in time since they have longer paths of flight. However, a signal needs to be very wide in frequency bandwidth in order to have good resolution in filtering out multipath components. For a signal with a 20 MHz bandwidth, the Inverse FFT (IFFT) of channel state information data samples are only resolvable to 50 ns, which corresponds to 50 feet of difference between the length of the path that the multipath component and direct component take. This resolution is not acceptable in many applications.

Figure 2:
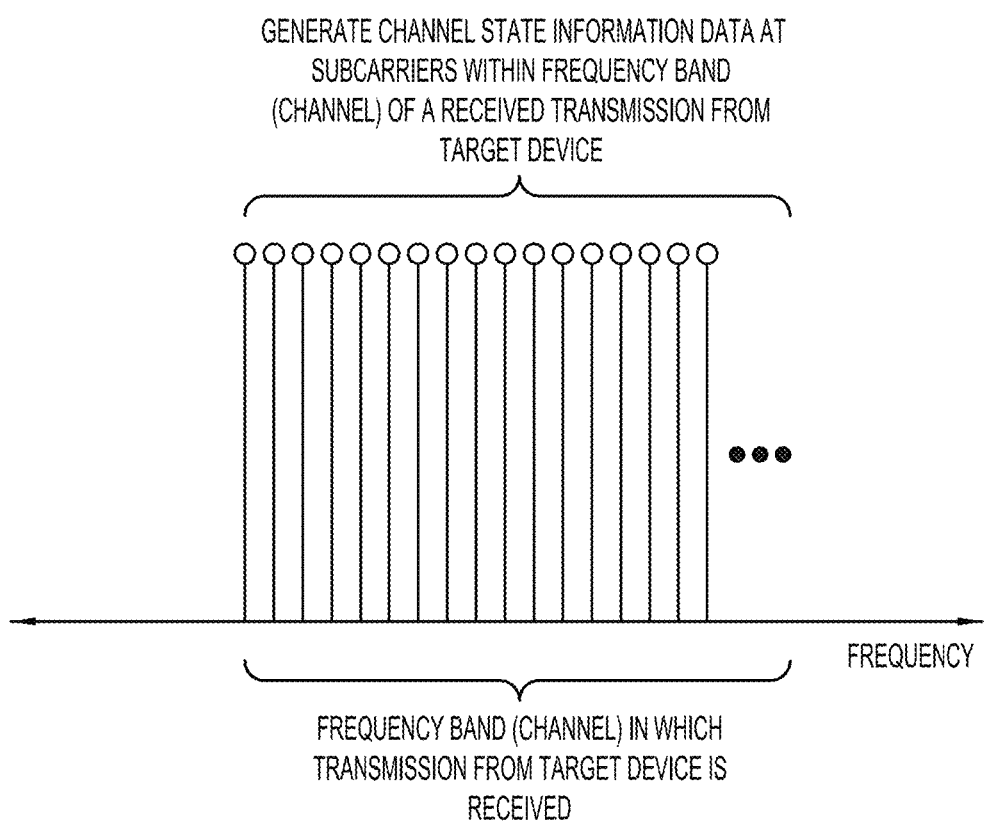
FIG. 2 is a diagram showing a plurality of subcarriers spanning a frequency bandwidth of the received transmission, from which groups of subcarriers are formed for separate processing of channel state information, according to an example embodiment.
Figure 3:
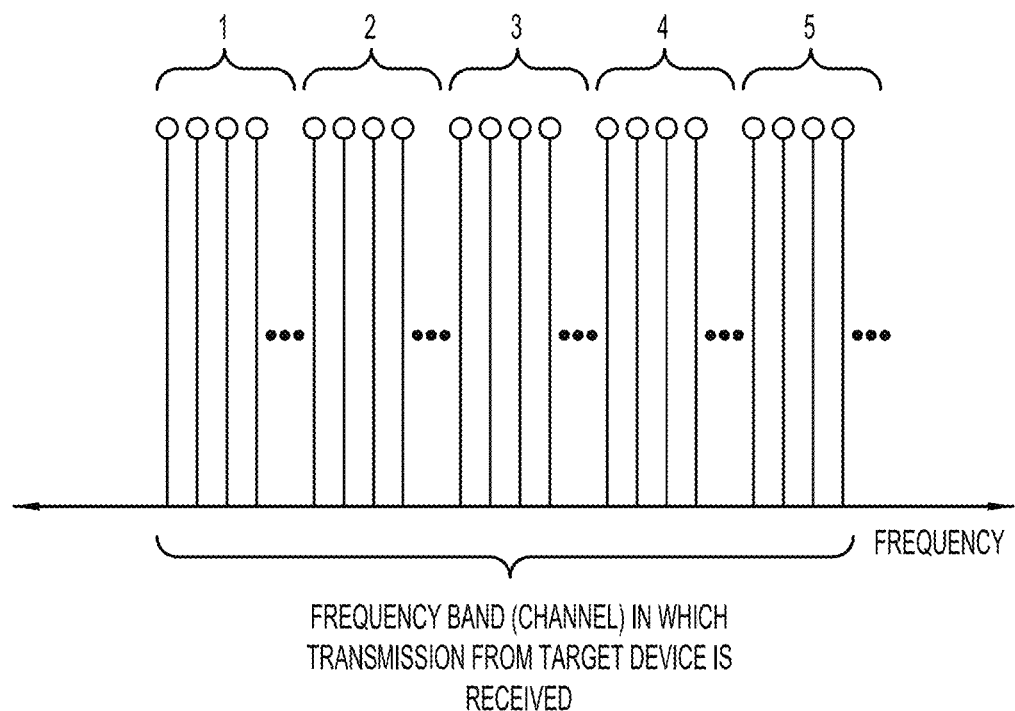
FIG. 3 is a diagram, similar to FIG. 2, but showing the groups of subcarriers for which channel state information is separately processed, according to an example embodiment.
Figure 4:
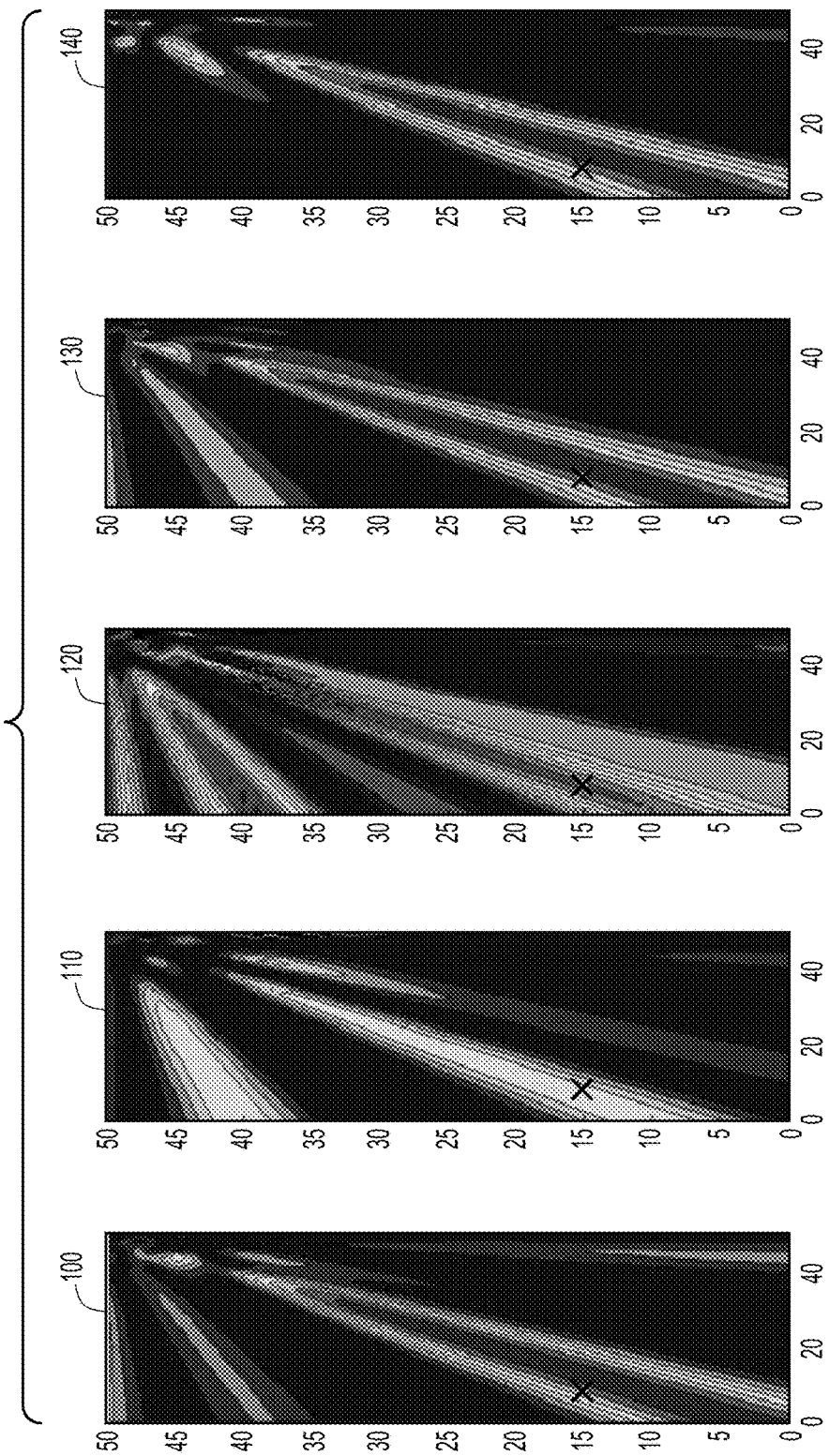
FIG. 4 is a diagram showing location probability map data generated for individual groups of subcarriers, according to an example embodiment.

Reference is now made to FIGS. 2-4. FIG. 2 shows subcarriers of a received transmission at an AP from a target device. The subcarriers span a frequency band, e.g., a channel corresponding to a frequency bandwidth of a wireless transmission sent by the target device. When received at its plurality of antennas, the AP generates channel state information data within the frequency band of the received transmission from the target device.

Turning to FIG. 3, the channel state information data at the subcarriers that span the frequency band of interest is separated by groups of subcarriers to produce subcarrier group specific data for each of a plurality of groups of subcarriers. In one example, subcarriers spanning the frequency band of interest are divided into groups of subcarriers, such as five groups of subcarriers, e.g., as shown in FIG. 3, where groups 1, 2, 3, 4 and 5 are identified. Thus, the plurality of groups of subcarriers spans a frequency bandwidth of the wireless transmission received from the target device. It has been determined that breaking the phase estimation data into groups of subcarriers can reduce negative effects of multipath.

Reference is now made to FIG. 4. FIG. 4 shows location probability map data for each of the groups of subcarriers. That is, the location probability map data at reference 100 is the probability map data for subcarrier group 1 from FIG. 3, the location probability map data at reference 110 is the probability map data for subcarrier group 2, the location probability map data at reference 120 is the probability map data for subcarrier group 3, the location probability map data at reference 130 is the probability map data for subcarrier group 4, and the location probability map data at reference 140 is the probability map data for subcarrier group 5. The set of location probability map data (also known as "heatmaps") shown in FIG. 4 illustrate how multipath can lead to different solutions within a single 20 MHz frequency band (channel). FIG. 4 shows 5 separate subcarrier groups that cover the full bandwidth of interest. Each group is made up of a contiguous set of adjacent subcarriers.

The location of the AP that receives the transmission from the target device is indicated in the upper right corner of the location probability maps shown in FIG. 4. The location of the target device is shown by the "X" in the location probability map data for each of the subcarrier groups. Note that the direct ray is highly correlated across the location probability map data generated from different subcarrier groups and the multipath is much less correlated. In FIG. 4, the location probability maps are generated from angle vectors from the lowest $\frac{1}{5}$ frequency of the signal bandwidth, next lowest $\frac{1}{5}$, etc., up to the highest $\frac{1}{5}$ frequency of the signal bandwidth for a 20 MHz wide signal, as one example.

Thus, the techniques presented herein divide the subcarriers from the full bandwidth of the received signal into groups of subcarriers, and generates separate x-y location probability maps from the channel state information data for the respective groups of subcarriers, taking into consideration the difference center frequency when considering the wavelength. It is noted that the channel state information data may be converted to phase vector/phase estimation data prior to the computation of the probability location map data for each subcarrier group.

The location probability map data for the multiple subcarrier groups is combined in any of a variety of ways to produce aggregate location probability map data. Examples of techniques to combine the location probability map data for each of the subcarrier groups are described hereinafter.

Figure 5:
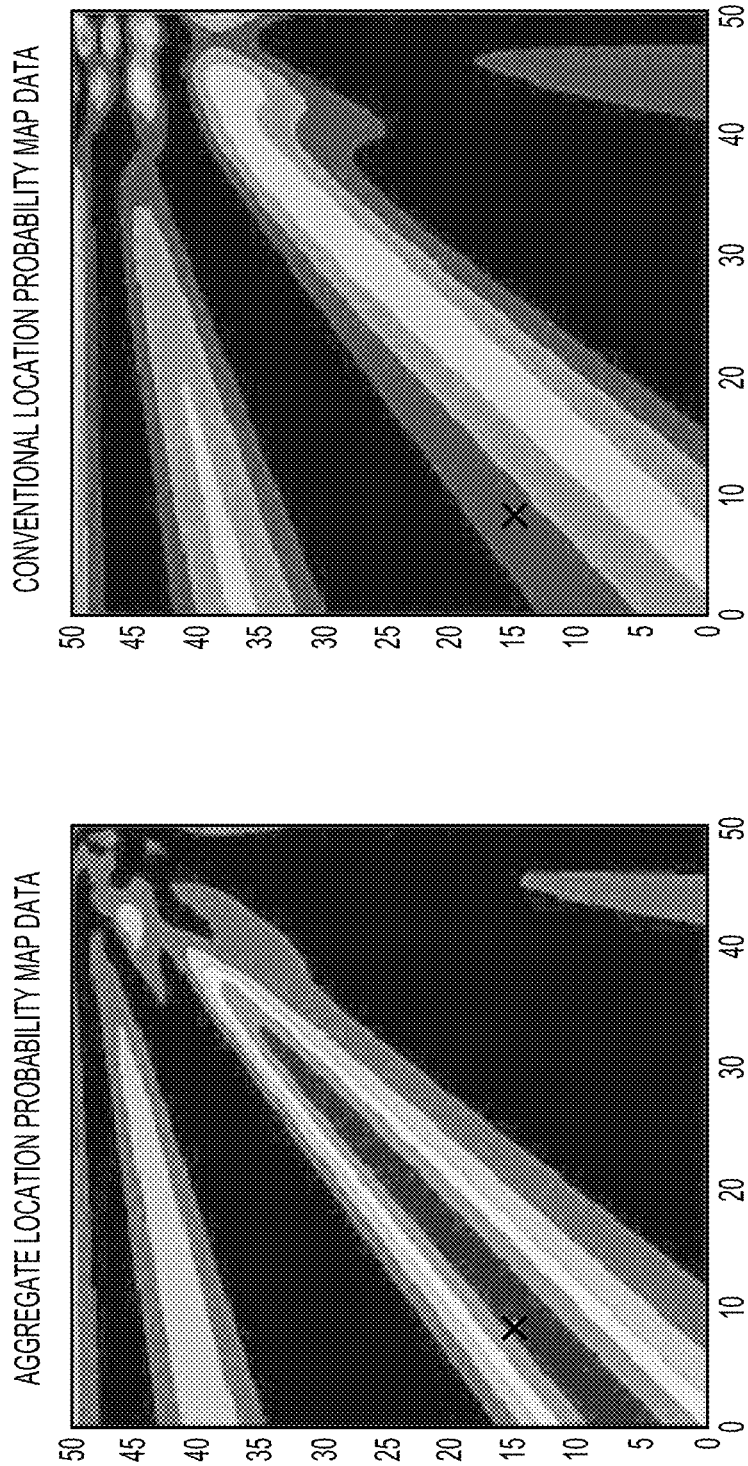
FIG. 5A illustrates aggregate location probability map data generated from the probability map data for the groups of subcarriers shown in FIG. 4, according to an example embodiment.
FIG. 5B illustrates location probability map data generated without partitioning the bandwidth of a received transmission into groups of subcarriers and processing of channel state information data for the entire bandwidth.

Next, reference is made to FIGS. 5A and 5B. FIG. 5A illustrates aggregate location probability data computed by combining the location probability map data for the individual subcarrier groups as shown in FIG. 4. Again, the location of the target device is shown by the "X" in FIG. 5A, which is indicated by the strongest/most dominant path of the location probability map data. By contrast, FIG. 5B shows conventional location probability map data generated from processing the phase estimation data for the entire frequency band in one chunk. In the plot of FIG. 5B, the path through the target device location is not dominant and actually shows up weaker than other incorrect locations.

Thus, FIGS. 5A and 5B illustrate that when combining the location probability map data from the individual subcarrier groups, it is possible to achieve very good multipath mitigation in comparison with simply generating a single location probability map from the full bandwidth of subcarriers.

One technique to generate the aggregate location probability map data involves direct summing of the location probability map data. Another technique is to perform a maximum likelihood (ML) computation from the location probability data for the different subcarrier groups, in which case a summation is generated for the errors. Still another technique is to take a correlation between values measured and what is expected for a given point on the floor, and then sum those correlation values across different subcarrier groups.

In a conventional method in which subcarrier group partitioning is not used, the channel state information (represented by a nRx (number of receivers/antennas)×numSubcarriers matrix, H) is converted into a nRx length vector as follows: lambdaMeasured_noBWpartitioning=angle(conj(H(iReference,:))*transpose(H))/2/pi, where iReference is a reference subcarrier value for a receiver chain against which a comparison is made for purposes of channel state information computation, and is arbitrarily selected as a reference for the phase, and then across all subcarriers, a rotation is made with respect to that reference and then summed together.

When subcarrier group partitioning is used according to the techniques presented herein, location probability map data (i.e., heatmap) is generated separately by groups of subcarriers with their own center frequencies/wavelengths, such as according to the computation: lambdaMeasured_Partition_i=angle(conj(H(iReference, iSubSet))*transpose(H(:,iSubSet)))/2/pi, where iSubSet is subcarrier index for a given subcarrier group i.

Figure 6:
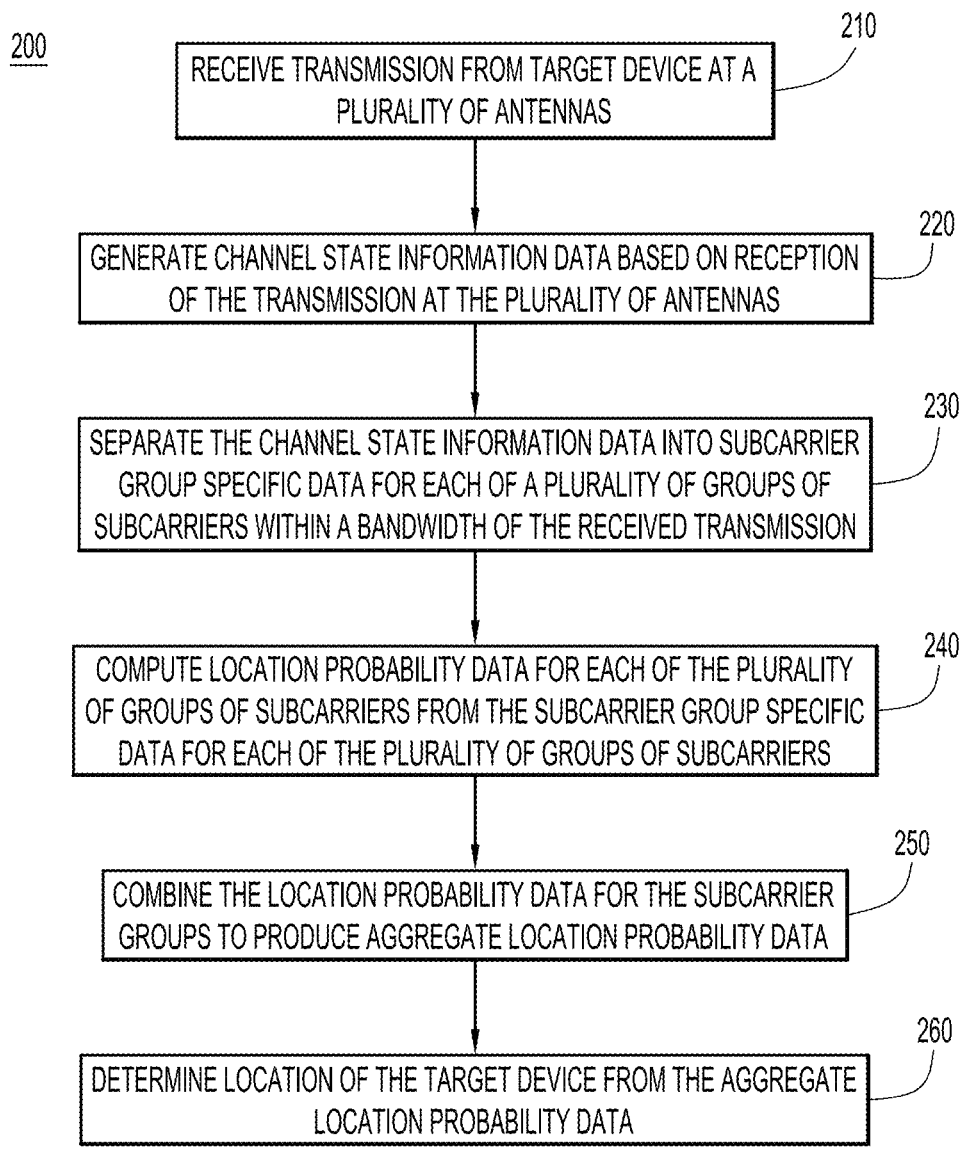
FIG. 6 is a flow chart depicting operations of a method of performing subcarrier group based location processing of a received transmission as depicted in FIGS. 3, 4 and 5A, according to an example embodiment.

Reference is now made to FIG. 6. FIG. 6 illustrates a flow chart depicting a method 200 of operations performed according to the techniques described above in connection with FIGS. 1-5A, 5B. It should be understood that in the simplest case, only a single AP receives signals from the target device whose location is to be determined. However, these techniques also apply to a situation in which multiple APs receive a transmission (or multiple transmissions) from the target device whose location is to be determined.

At 210, an AP receives, at its plurality of antennas, a transmission from the target device whose location is to be determined. At 220, the AP generates channel state information based on reception of the transmission at the plurality of antennas. At 230, the AP separates (divides or partitions) the channel state information data into subcarrier group specific data for each of a plurality of groups of subcarriers within a bandwidth of the received transmission. The plurality of groups of subcarriers spans the frequency band of interest. The subcarriers may be contiguous subcarriers within each group. Operation 210 is performed at the AP. Operations 220 and 230 are also performed at the AP, though operation 230 may be performed at a server, such as at the mobility services server 50 based on data sent to the mobility services server 50 from the AP. At 240, location probability map data is computed for each of the plurality of groups of subcarriers from the subcarrier group specific data for each (i.e., individual ones) of the plurality of groups of subcarriers. At 250, the location probability map data for the plurality of groups of subcarriers are combined to produce aggregate location probability map data. At 260, the location of the target device is determined from the aggregate location probability map data. Operations 240, 250 and 260 may be performed at a central server, e.g., the mobility services server 50, or at an AP.

In the case in which multiple APs are involved in a location procedure, the receiving, generating and separating operations 210, 220 and 230 are performed for each of a plurality of APs (each of which having a plurality of antennas) that receives the wireless transmission from the target device, so as to produce for each of the plurality of APs, subcarrier group specific data for each of the plurality of groups of subcarriers. Furthermore, in the case of multiple APs, the computing operation 240 involves computing, for each of the plurality of wireless devices, location probability data for each of the plurality of groups of subcarriers from the subcarrier group specific data for respective ones of the plurality of groups of subcarriers at each of the plurality of APs.

Furthermore, in the case of multiple APs, the combining operation 250 involves combining the location probability data for the plurality of subcarrier groups across the plurality of wireless devices to produce the aggregate location probability data. In other words, the location probability data for all of the subcarrier groups across all of the APs are combined for the single solution. That is, the location probability data for subcarrier groups at all APs is combined, i.e., subcarrier group (SG) 1 at AP1 (SG1/AP1)+SG1/AP2 . . . +SG2/AP1+SG2/AP2 . . . =SGlast/APlast are combined to produce the aggregate probability location data.

As explained above, the combining operation may involve summing the location probability map data for the plurality of subcarrier groups, or performing a maximum likelihood computation based on the location probability data for the plurality of subcarrier groups. To reiterate, when combining the location probability data across the plurality of subcarrier groups for a plurality of APs, the combining may involve adding:

1. Correlation between measured phases and expected phases for a location; or
2. Sum of squared error between measured phases and expected phases for a location; or
3. Any other input to probability estimation.

Figure 7:
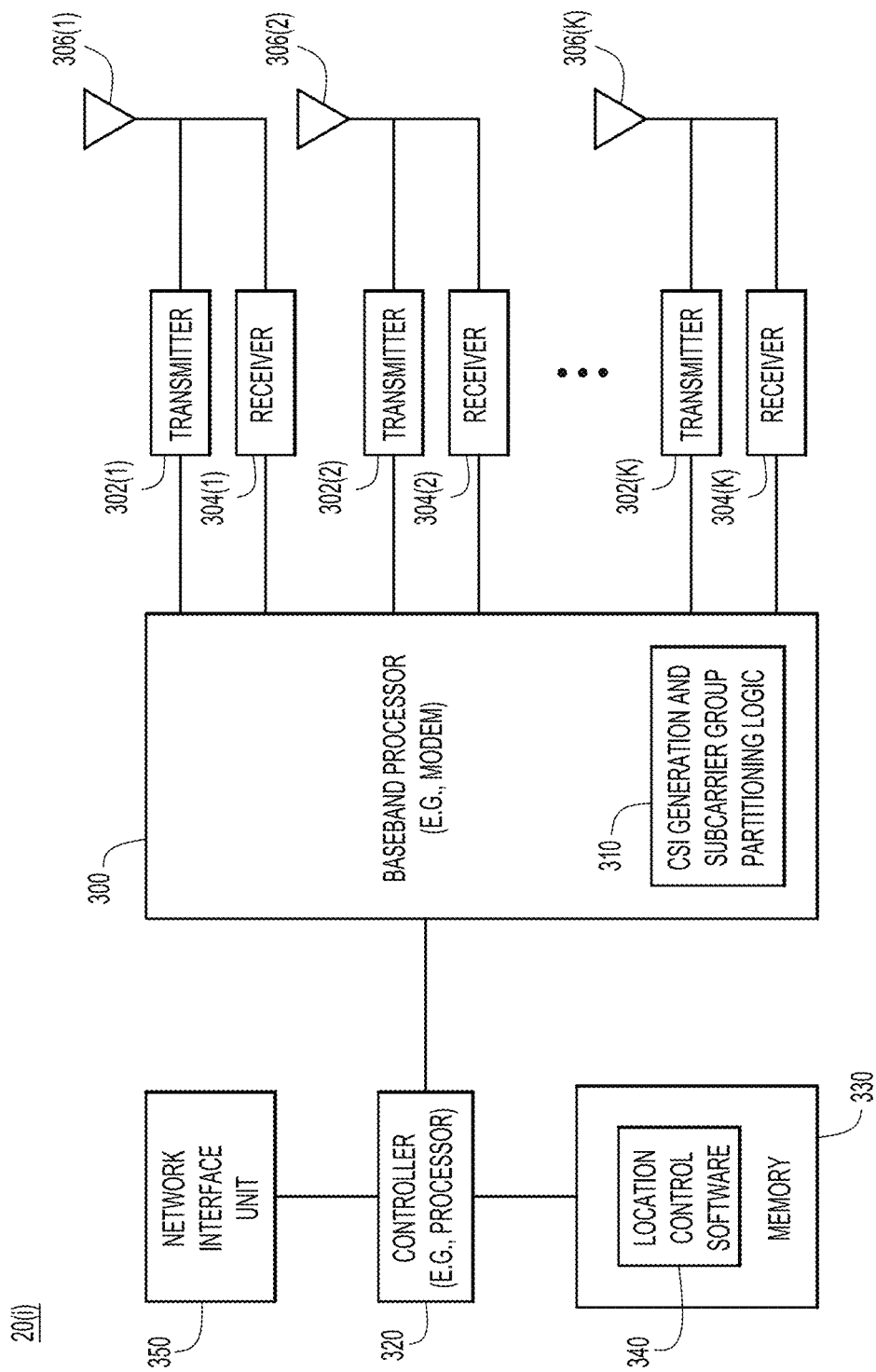
FIG. 7 is a block diagram of a wireless device configured to generate subcarrier group specific channel state information from a received wireless transmission, according to an example embodiment.

Reference is now made to FIG. 7 that shows a block diagram of a wireless device, e.g., an AP, which is capable of performing operations related to the embodiments presented herein. The AP shown in FIG. 7 is identified generally by reference numeral 20($i$) and is representative of any of the APs shown in FIG. 1.

The AP 20($i$) includes a baseband processor (e.g., modem) 300, a plurality of transmitters 302(1)-302(K), a plurality of receivers 304(1)-304(K), a plurality of antennas 306(1)-306(K), a controller 320 and a memory 330. Each transmitter 302(1)-302(K) is connected to a corresponding one of the plurality of antennas 306(1)-306(K), and likewise each receiver 304(1)-304(K) is connected to a corresponding one of the plurality of antennas 306(1)-306(K). The baseband processor 300 includes CSI generation and subcarrier group partitioning logic 310 that is used to send generate CSI from received signals at the antennas 306(1)-306(K), and to partition that CSI into subcarrier groups as shown and described above. The baseband processor 300 includes logic needed for FFT and other related computations made based on reception of an OFDM signal that comprises a plurality of subcarriers that span a frequency bandwidth of a received transmission.

The baseband processor 100 may be implemented by fixed or programmable digital logic gates, such as in the form of an application specific integrated circuit (ASIC), or may be implemented by a dedicated digital signal processor, microprocessor or microcontroller. The CSI generation and subcarrier group partitioning logic 310 is only one of several functional blocks of the baseband processor 300, and again, it may be implemented by digital logic gates or by instructions executed by a microprocessor.

The controller 320 is coupled to the baseband processor 300 and provides higher level control for the AP 20($i$). The controller 320 may be a microprocessor or microcontroller. The memory 330 stores instructions that the controller 320 executes to perform the control functions of the AP 20($i$). Among these functions are operations performed when the controller 320 executes the location control software 140 stored in memory 330.

The memory 330 may comprise read only memory (ROM), random access memory (RAM), magnetic disk storage media devices, optical storage media devices, flash memory devices, electrical, optical, or other physical/tangible memory storage devices. Thus, in general, the memory 330 may comprise one or more tangible (non-transitory) computer readable storage media (e.g., a memory device) encoded with software comprising computer executable instructions and when the software is executed (by the controller 320) it is operable to perform the operations described herein. Moreover, the functions of the CSI generation and subcarrier group partitioning logic 310 may take the form of software stored in memory 330 and executed by the controller 320.

The AP 20(*i*) further includes a network interface unit 350, e.g., an Ethernet card, which enables the AP 20(*i*) to communicate over a wired network. The network interface unit 350 thus enables the AP 20(*i*) to receive commands from the WLAN controller 40 or mobility services server 50, and to send data, such as channel state information data or subcarrier group specific data for each of a plurality of groups of subcarriers.

Figure 8:
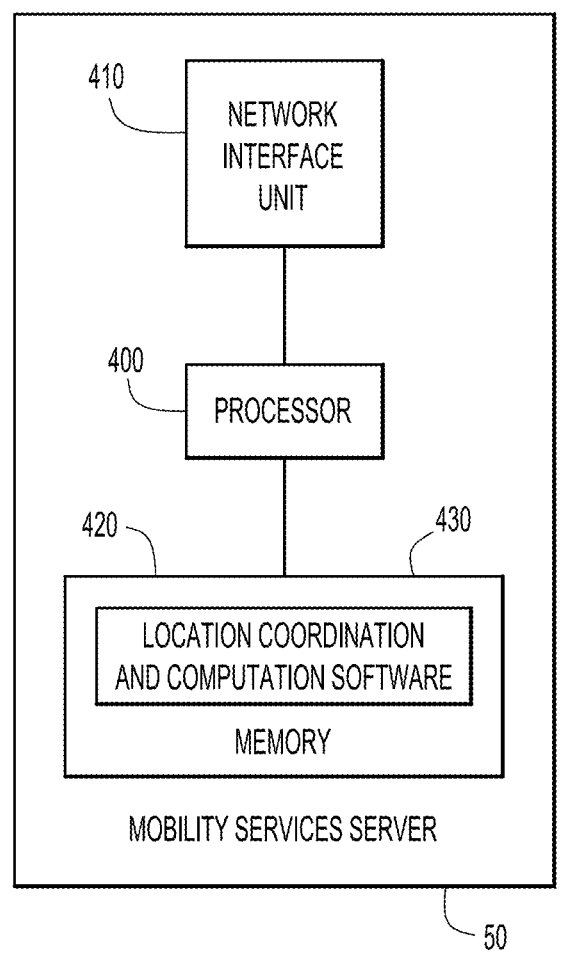
FIG. 8 is a block diagram of a server configured to process subcarrier group specific channel state information to generate location probability map data for individual groups of subcarriers, and to generate aggregate location probability map data, according to an example embodiment.

Reference is now made to FIG. 8. FIG. 8 illustrates a block diagram of the mobility services server 50, according to an example embodiment. The mobility services server 50 may take the form of a physical device, separate from the WLAN controller 40, or combined with the WLAN controller 40. Moreover, the mobility services server 50 may take the form of an application running in a data center or cloud computing environment. The mobility services server 50 includes a processor 400, a network interface unit 410 and a memory 420. The processor 400 may be a microprocessor or microcontroller, or several instances of such devices. The network interface unit 410 may include one or more network interface cards that enable network connectivity for the mobility services server 50 to communicate with the APs in a wireless network deployment, and to communicate with a network administrator application. The memory may 420 may take any of the forms of the memory described above in connection with FIG. 7. Location coordination and computation software 430 includes instructions stored in memory that, when executed by the processor 400, cause the processor to perform various location related functions to coordinate a location procedure to locate a target device with one or more APs, and to perform computations based on data sent to the mobility services server 50 by the one or more APs that participate in a location procedure. Thus, the processor 400, when it executes the location coordination and computation software 430, may perform operations 230-260 described above in connection with FIG. 6, or if the AP(s) participating in the location procedure generate and send the subcarrier group specific data to the mobility services server 50, then the processor 400 need only perform operations 240-260.

Figure 9:
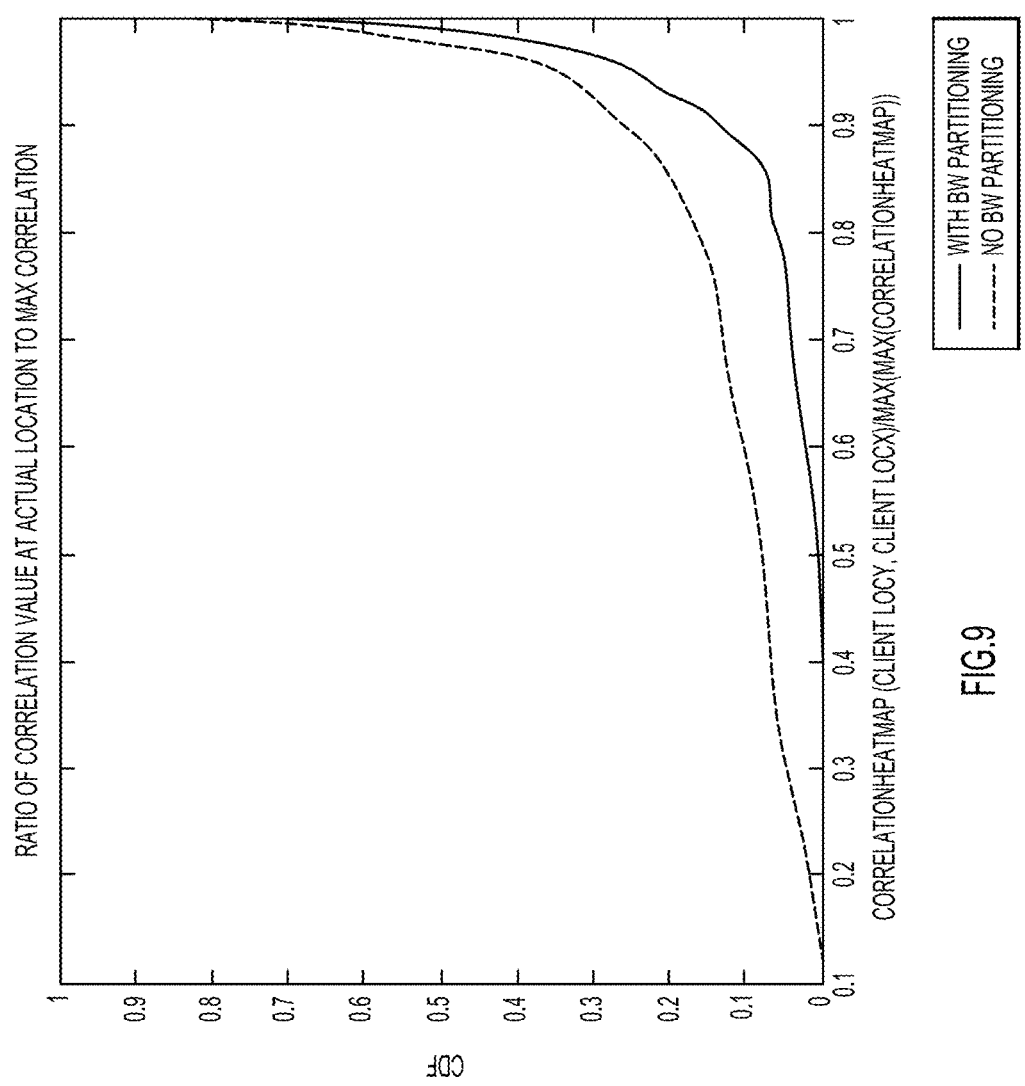
FIG. 9 illustrates examples of cumulative distribution function plots comparing performance of a location procedure that uses the subcarrier group partitioning techniques presented herein with a location procedure that does not use the subcarrier group partitioning techniques.

FIG. 9 illustrates a cumulative distribution function (CDF) that demonstrates the improvement achieved using the subcarrier group partitioning techniques presented herein. By generating the probability location map data (e.g., heatmaps) separately by different swaths of subcarriers, the contribution of an antenna array's correlation at a known target device location increases noticeably relative to a maximum correlation value of the heatmap. Ideally, the ratio of the correlation value at the known location on the heatmap to the maximum correlation would be 1 (when they are the same point in the heatmap). FIG. 9 illustrates a CDF plot of that ratio when partitioning the signal bandwidth into multiple groups (solid line) and when no partitioning is used and there is a single subcarrier group across the entire signal bandwidth (dashed line). The CDF with bandwidth partitioning shows a distribution much closer to 1.

Figure 10:
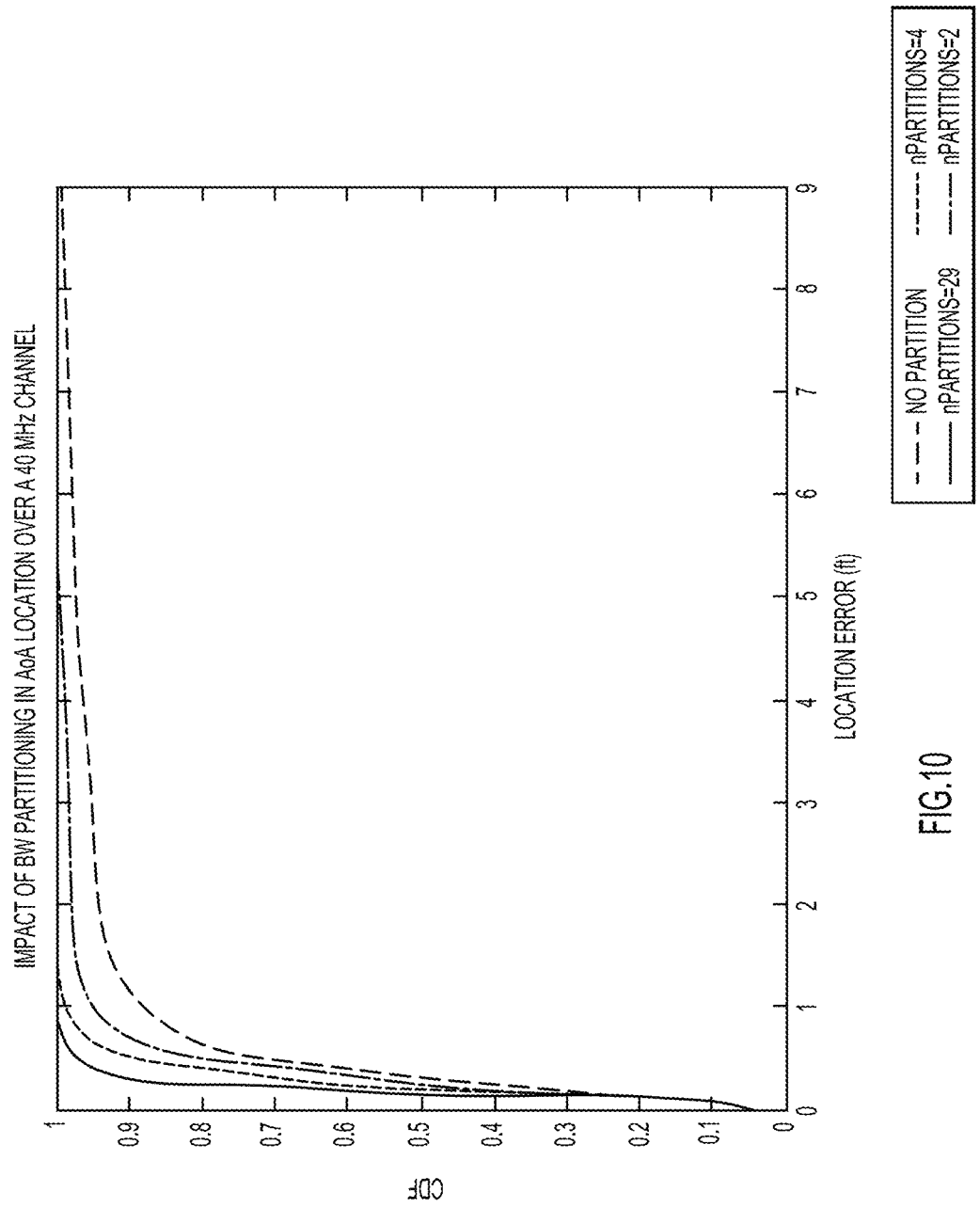
FIG. 10 illustrates examples of cumulative distribution function plots showing performance improvement that can be achieved as a greater number of subcarrier groups/partitions are used, according to an example embodiment.

Reference is now made to FIG. 10. FIG. 10 shows several CDF plots that illustrate the impact of bandwidth partition on location error over a 40 MHz channel. As is evident from FIG. 10, the number of bandwidth partitions increase, the location error is substantially reduced.

To summarize, the techniques presented herein involve breaking the full bandwidth of channel state information into multiple subcarrier partitions of contiguous subcarriers, processing the raw channel state information data from those partitions separately into their own probability location map data (heatmap), and combining the probability location map data, such as by a sum of squares in an maximum likelihood solution, to obtain aggregate probability location map data. The separate processing of the partitions has the impact of contributing similarly to the correct solution and more randomly to the wrong (multipath) solutions, and in so doing, reduces the impact of multipath and noise, even in a relatively narrow bandwidth.

While the techniques presented herein have been described with respect to a WLAN, this is not meant to be limiting. These techniques are applicable to any location procedure in which wireless transmissions from a target device are received at a plurality of antennas (e.g., an antenna array) of one or more wireless device.

Thus, in one form, a method is provided comprising: receiving at a wireless device having a plurality of antennas, a wireless transmission from a target device whose location is to be determined; generating channel state information data based on reception of the transmission at the plurality of antennas; separating the channel state information data into subcarrier group specific data for each of a plurality of groups of subcarriers within a bandwidth of the received transmission; computing location probability data for each of the plurality of groups of subcarriers from the subcarrier group specific data for respective ones of the plurality of groups of subcarriers; combining the location probability data for the plurality of groups of subcarriers to produce aggregate location probability data; and determining a location of the target device from the aggregate location probability data.

In another form, an apparatus is provided comprising: a plurality of receivers, each associated with a corresponding one of a plurality of antennas; a network interface unit that enables network communication; and a processor coupled to the plurality of receivers, wherein the processor: generates channel state information data based on reception at the plurality of antennas of a wireless transmission from a target device whose location is to be determined; and separates the channel state information data into subcarrier group specific data for each of a plurality of groups of subcarriers within a bandwidth of the wireless transmission.

In yet another form, a non-transitory computer readable storage media is provided that is encoded with instructions that, when executed by a processor, cause the processor to perform operations comprising: computing location probability data for each of a plurality of groups of subcarriers that spans a bandwidth of a wireless transmission received at a plurality of antennas of a wireless device from a target device whose location is to be determined, the location probability data being computed from channel state information for individual ones of the plurality of groups of subcarriers based on reception of the wireless transmission at the plurality of antennas of the wireless device; combining the location probability data for the plurality of groups of subcarriers to produce aggregate location probability data; and determining a location of the target device from the aggregate location probability data.

In still another form, a system is provided comprising: at least one wireless device having a plurality of antennas, wherein the wireless device: receives at the plurality of antennas a wireless transmission from a target device whose location is to be determined; generates channel state information data based on reception of the transmission at the plurality of antennas; and separates the channel state information data into subcarrier group specific data for each of a plurality of groups of subcarriers within a bandwidth of the received transmission; and a server in communication with the wireless device, wherein the server: receives the subcarrier group specific data for each of the plurality of groups of subcarriers; computes location probability data for each of the plurality of groups of subcarriers from the subcarrier group specific data for respective ones of the plurality of groups of subcarriers; combines the location probability data for the plurality of groups of subcarriers to produce aggregate location probability data; and determines a location of the target device from the aggregate location probability.

The above description is intended by way of example only. Various modifications and structural changes may be made therein without departing from the scope of the concepts described herein and within the scope and range of equivalents of the claims.

What is claimed is:

1. A method comprising:
    receiving at a wireless device having a plurality of antennas, a wireless transmission from a target device whose location is to be determined;
    at the wireless device, generating channel state information data at a plurality of groups of subcarriers within a frequency bandwidth of the wireless transmission based on reception of the transmission at respective ones of the plurality of antennas of the wireless device;
    separating the channel state information data into subcarrier group specific data for each of the plurality of groups of subcarriers within the frequency bandwidth of the wireless transmission;
    computing subcarrier group specific location probability data for each of the plurality of groups of subcarriers from the subcarrier group specific data for respective ones of the plurality of groups of subcarriers;
    combining the subcarrier group specific location probability data for the plurality of groups of subcarriers to produce aggregate location probability data; and
    determining a location of the target device from the aggregate location probability data.

2. The method of claim 1, wherein receiving, generating and separating are performed for each of a plurality of wireless devices that receives the wireless transmission from the target device, each of the plurality of wireless devices having a plurality of antennas, so as to produce, for each of the plurality of wireless devices, subcarrier group specific data for each of the plurality of groups of subcarriers.

3. The method of claim 2, wherein computing comprises computing, for each of the plurality of wireless devices, subcarrier group specific location probability data for each of the plurality of groups of subcarriers from the subcarrier group specific data for respective ones of the plurality of groups of subcarriers.

4. The method of claim 3, wherein combining comprises combining the subcarrier group specific location probability data for the plurality of subcarrier groups across the plurality of wireless devices to produce the aggregate location probability data.

5. The method of claim 1, wherein combining includes summing the subcarrier group specific location probability data for the plurality of groups of subcarriers.

6. The method of claim 1, wherein combining includes performing a maximum likelihood computation based on the subcarrier group specific location probability data for the plurality of groups of subcarriers.

7. The method of claim 1, wherein combining includes adding a correlation between measured phases and expected phases for a location.

8. The method of claim 1, wherein combining includes adding a sum of squared error between measured phases and expected phases for a location.

9. The method of claim 1, wherein generating and separating are performed at the wireless device, and further comprising sending the subcarrier group specific data for each of the plurality of groups of subcarriers to a server, and wherein computing subcarrier group specific location probability data, combining the subcarrier group specific location probability data and determining the location of the target device are performed at the server.

10. The method of claim 1, wherein each group of subcarriers comprises a contiguous set of adjacent subcarriers.

11. A system comprising:
    a device including:
        a plurality of receivers, each associated with a corresponding one of a plurality of antennas; and
        a network interface unit that enables network communication;
        a processor coupled to the plurality of receivers, wherein the processor is configured to:
            generate channel state information data at a plurality of groups of subcarriers within a frequency bandwidth of a wireless transmission based on reception, at respective ones of the plurality of antennas, of the wireless transmission from a target device whose location is to be determined;
            separate the channel state information data into subcarrier group specific data for each of the plurality of groups of subcarriers within the frequency bandwidth of the wireless transmission; and
    a server configured to:
        receive, via the network interface unit, the subcarrier group specific data from the device;
        compute subcarrier group specific location probability data for each of the plurality of groups of subcarriers from the subcarrier group specific data for respective ones of the plurality of groups of subcarriers;
        combine the subcarrier group specific location probability data for the plurality of groups of subcarriers to produce aggregate location probability data; and
        determine a location of the target device from the aggregate location probability data.

12. The system of claim 11, wherein each group of subcarriers comprises a contiguous set of adjacent subcarriers.

13. The system of claim 11, wherein the processor is configured to compute subcarrier group specific location probability data for each of the plurality of groups of subcarriers from the subcarrier group specific data for respective ones of the plurality of groups of subcarriers.

14. The system of claim 13, wherein the processor is configured to combine the subcarrier group specific location probability data for the plurality of groups of subcarriers to produce aggregate location probability data.

15. The system of claim 11, wherein the server is configured to combine the subcarrier group specific location probability data for the plurality of groups of subcarriers by summing the subcarrier group specific location probability data for the plurality of groups of subcarriers.

16. The system of claim 11, wherein the server is configured to combine the subcarrier group specific location probability data for the plurality of groups of subcarriers by performing a maximum likelihood computation based on the subcarrier group specific location probability data for the plurality of groups of subcarriers.

17. The system of claim 11, wherein the server is configured to combine the subcarrier group specific location probability data by adding a correlation between measured phases and expected phases for a location.

18. The system of claim 11, wherein the server is configured to combine the subcarrier group specific location probability data by adding a sum of squared error between measured phases and expected phases for a location.

19. A non-transitory computer readable storage media encoded with instructions that, when executed by a processor, cause the processor to perform operations comprising:
 computing subcarrier group specific location probability data for each of a plurality of groups of subcarriers that spans a frequency bandwidth of a wireless transmission received at respective ones of a plurality of antennas of a wireless device from a target device whose location is to be determined, the subcarrier group specific location probability data being computed from channel state information for individual ones of the plurality of groups of subcarriers based on reception of the wireless transmission at the plurality of antennas of the wireless device;
 combining the subcarrier group specific location probability data for the plurality of groups of subcarriers to produce aggregate location probability data; and
 determining a location of the target device from the aggregate location probability data.

20. The non-transitory computer readable storage media of claim 19, wherein the instructions operable for computing subcarrier group specific location probability data is performed for each of a plurality of wireless devices that receives the wireless transmission from the target device, each of the plurality of wireless devices having a plurality of antennas, so as to produce, for each of the plurality of wireless devices, subcarrier group specific data for each of the plurality of groups of subcarriers.

21. The non-transitory computer readable storage media of claim 20, wherein the instructions operable for combining comprise instructions operable for combining the subcarrier group specific location probability data for the plurality of subcarrier groups across the plurality of wireless devices to produce the aggregate location probability data.

22. The non-transitory computer readable storage media of claim 19, wherein the instructions operable for combining comprise instructions operable for summing the subcarrier group specific location probability data for the plurality of groups of subcarriers.

23. The non-transitory computer readable storage media of claim 19, wherein the instructions operable for combining comprise instructions operable for performing a maximum likelihood computation based on the subcarrier group specific location probability data for the plurality of groups of subcarriers.

24. The non-transitory computer readable storage media of claim 19, wherein the instructions operable for combining comprise instructions operable to add a correlation between measured phases and expected phases for a location.

25. The non-transitory computer readable storage media of claim 19, wherein the instructions operable for combining comprise instructions operable to add a sum of squared error between measured phases and expected phases for a location.

26. The non-transitory computer readable storage media of claim 19, wherein each group of subcarriers comprises a contiguous set of adjacent subcarriers.

\* \* \* \* \*